United States Patent [19]

Babb

[11] 4,368,577

[45] Jan. 18, 1983

[54] HAND TOOL FOR CUTTING PLASTIC PIPE OR THE LIKE

[75] Inventor: Larry F. Babb, LaGrange, Ohio

[73] Assignee: Emerson Electric Co., St. Louis, Mo.

[21] Appl. No.: 84,544

[22] Filed: Oct. 15, 1979

[51] Int. Cl.³ .............................................. B23D 21/06

[52] U.S. Cl. .......................................... 30/92; 30/251; 30/258

[58] Field of Search ..................... 30/92, 94, 251, 250, 30/192, 193, 189, 190, 253, 249, 252, 258

[56] References Cited

U.S. PATENT DOCUMENTS

| | | | |
|---|---|---|---|
| 476,279 | 6/1892 | Levin | 30/258 |
| 2,280,159 | 4/1942 | Neal | 30/251 |
| 2,749,615 | 6/1956 | Griffon | 30/252 |
| 3,210,844 | 10/1965 | Tontscheff | 30/250 |
| 3,273,240 | 9/1966 | Florian | 30/251 |
| 3,390,455 | 7/1968 | Florian | 30/251 |
| 3,885,309 | 5/1975 | Lund et al. | 30/250 |
| 3,922,783 | 12/1975 | Hayes | 30/250 |
| 4,055,891 | 11/1977 | Wick | 30/92 |
| 4,084,317 | 4/1978 | Nakamura et al. | 30/94 |
| 4,094,064 | 6/1978 | Nishikawa et al. | 30/92 |
| 4,176,450 | 12/1979 | Muromoto | 30/92 |
| 4,178,682 | 12/1979 | Sadauskas | 30/251 |
| 4,186,484 | 2/1980 | Tanaka | 30/92 |
| 4,223,439 | 9/1980 | Rommel | 30/253 |

FOREIGN PATENT DOCUMENTS

| | | | |
|---|---|---|---|
| 822999 | 1/1938 | France | 30/250 |
| 1163933 | 9/1969 | United Kingdom . | |
| 1518648 | 7/1978 | United Kingdom . | |

*Primary Examiner*—Stephen G. Kunin
*Assistant Examiner*—J. T. Zatarga
*Attorney, Agent, or Firm*—Polster, Polster and Lucchesi

[57] ABSTRACT

Hand-held and hand-operated cutting tool particularly well suited for cleanly and quickly cutting plastic pipe or tubing, rubber hose, or the like. The tool has a blade rotatable in increments or steps from a retracted position in which it is enclosed within a housing to a cutoff position in which it cooperates with a stationary anvil so as to sever the article to be cut. A ratchet drive interconnects a movable handle and the blade so as to incrementally drive the blade toward its cutoff position upon manipulation of the handle. A pawl prevents opening of the blade caused by the springiness of the article being cut upon being engaged by the blade. Upon severing of the article, the blade may be readily returned to its retracted position by, for example, releasing a thumb operated locking pawl.

8 Claims, 4 Drawing Figures

HAND TOOL FOR CUTTING PLASTIC PIPE OR THE LIKE

BACKGROUND OF THE INVENTION

This invention relates to hand tools, and more specifically to a hand tool for cutting plastic pipe or tubing, rubber hose, or other similar non-metallic materials.

In recent years, the use of plastic pipe, plastic tubing and heavy wall rubber tubing has become widespread. These items have, however, presented some difficulty in cutting them in the field so as to achieve a straight and true cut. Due to the low hardness of plastic pipe or tubing, as compared with metal pipe, and due to the resiliency of the plastic, it was recognized that it should be possible to cleanly and quickly cut plastic pipe by means of a movable blade which closes on the pipe and pinches it between the movable blade and a stationary anvil or cutting jaw. However, the softness or compressibility of certain types of plastic or rubber pipe, the thickness of the plastic or rubber pipe to be cut, and the substantial cutting force required to sever many plastic or rubber pipes have posed major problems in the design of suitable plastic pipe cutters. Oftentimes the needs for exerting high cutting forces simultaneously with the need for exerting these cutting forces through a relatively large distance (for example in the case of cutting 1¼ inch (3.2 cm.) diameter plastic piping) have worked against one another. Oftentimes, a prior art plastic pipe cutter design would overcome one of these problems only encounter another.

Certain of the prior art plastic pipe cutters used a ratchet drive for moving a shear blade through its cutting stroke so that the operator could readily exert the high forces needed to sever the plastic pipe and so that the shear blade may be moved through the distance necessary to cut through the pipe. However, in cutting certain types of soft plastic pipe, such as polybutylene, the tendency of the pipe to spring back to its original shape upon opening of the handles of the prior art pipe cutters when operating the ratchet drive caused the cutting blade to move away from the pipe thus effectively preventing the cutter from cutting the pipe. In certain of the prior art plastic pipe cutters, it was necessary for the user of the tool to grip the shear blade and to hold it against opening upon operation of the ratchet drive. Of course, this unnecessarily increased the risk of injury to the user.

Also, most of the prior art plastic pipe cutters had an exposed shear blade (or sharp tips of the blade) which extended out beyond the anvil when the blade was closed thereby presenting a hazard to the user of the tool. Furthermore, the exposed blades were more likely to be damaged.

Still another difficulty with certain prior art plastic pipe cutters was that a great amount of force was required to be manually applied to the handle of the tool so as to sever the plastic pipe and the user often was required to use both hands to operate the tool. It is, of course, desirable that one handed operation of the tool be possible so as to permit the user to grasp the pipe being cut or to simultaneously perform some other task. Also, in certain of the prior art plastic pipe cutters, the release of the shear blade from its closed position was difficult and oftentimes required the use of both hands to open the tool.

Reference may be made to U.S. Pat. Nos. 3,273,240 and 3,390,455 which disclose shears for cutting thick tree branches or the like in which a movable shear blade is operated via a handle and ratchet mechanism. U.S. Pat. No. 4,084,317 discloses a plastic pipe cutter broadly similar to the pipe cutter of the present invention.

Among the several objects and features of this invention may be noted the provision of a cutting tool particularly well-suited for cutting plastic pipe, rubber tubing, or other articles (preferably non-metallic articles) which are crushable or otherwise somewhat elastic or compressible;

The provision of such a cutter which may be readily used for one-handed operation both for cutting the article and for opening the tool;

The provision of such a tool which allows the operator to easily apply the high cutting forces necessary to cut the article and yet to apply these high cutting forces over a considerable distance so as to accommodate articles of appreciable thickness;

The provision of such a cutter which readily accepts and cuts any diameter or thickness of article within a range of diameters or thicknesses and in which the blade may be readily and rapidly moved into cutting engagement with the articles;

The provision of such a cutter in which the blade may be retracted clear of the article being cut at any point in the cutting stroke of the blade or upon severing of the article;

The provision of such a cutting tool in which the blade, when retracted, is enclosed thereby to protect the blade from damage and to protect the user from injury; and The provision of such a cutting tool which is easy and safe to use, which of rugged and economical construction, and which cleanly and quickly cuts a variety of articles.

Other objects and features of this invention will be in part apparent and in part pointed out hereinafter.

SUMMARY OF THE INVENTION

Briefly, a hand-held and hand-operated cutting tool of this invention is particularly well-suited for cutting an article A (see FIG. 3), such as plastic pipe or tubing, rubber hose, or the like. The tool comprises a frame or housing adapted to receive the article to be cut with a portion of the frame constituting a stationary anvil. A blade is provided having a cutting surface, the blade being rotatably mounted within the frame from a retracted position in which the blade including its cutting edge is enclosed within the frame and an extended cutoff position in which the cutting edge of the blade cooperates with the anvil so as to sever the article. A handle is pivotally supported on the frame for swinging between an open and a closed position. Means operable upon the repeated opening and the closing of the handle moves the blade in increments from its retracted to its cutoff position. Means is provided for holding the blade against returning toward its retracted position upon opening of the handle thereby to permit the blade to be advanced another increment toward its cutoff position upon the next closing movement of the handle.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
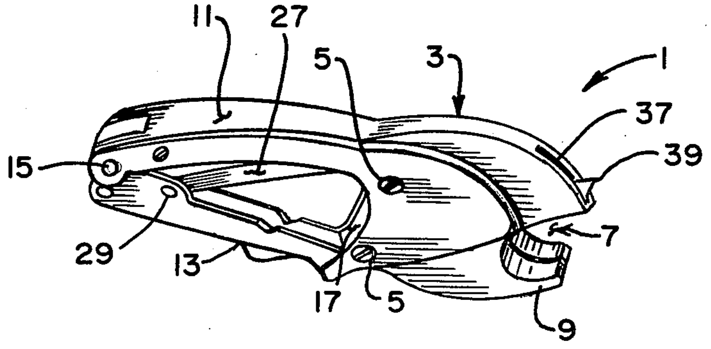
FIG. 1 is a perspective view of a first embodiment of a plastic pipe cutter of this invention.

Referring now to the drawings, a first embodiment of a hand-held cutting tool of this invention intended for one hand manual operation is indicated generally by reference character 1. The tool comprises a two part rigid frame or housing 3, preferably of die cast metal or the like, with the housing parts being secured together by screws 5. As generally indicated at 7, a notch is provided in one end of the housing (i.e., its front end) for reception of an article A to be cut. For example, the article to be cut may be a length of plastic tubing, plastic pipe, rubber hose, or other collapsible, soft (preferably non-metallic) material. A portion of the housing defining the lower part of notch 7 comprises a stationary anvil or jaw 9.

Figure 2:
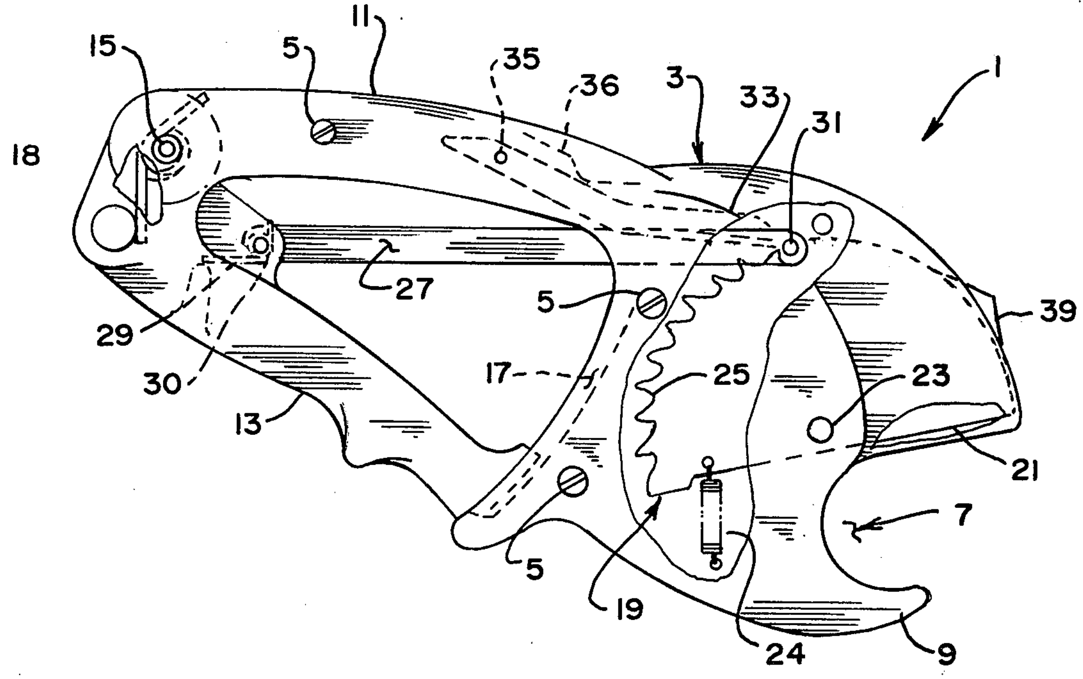
FIG. 2 is an enlarged side elevational view of the cutter shown in FIG. 1 with a portion of its housing or frame broken away to illustrate a cutting blade housed within the housing in its retracted position.
Figure 3:
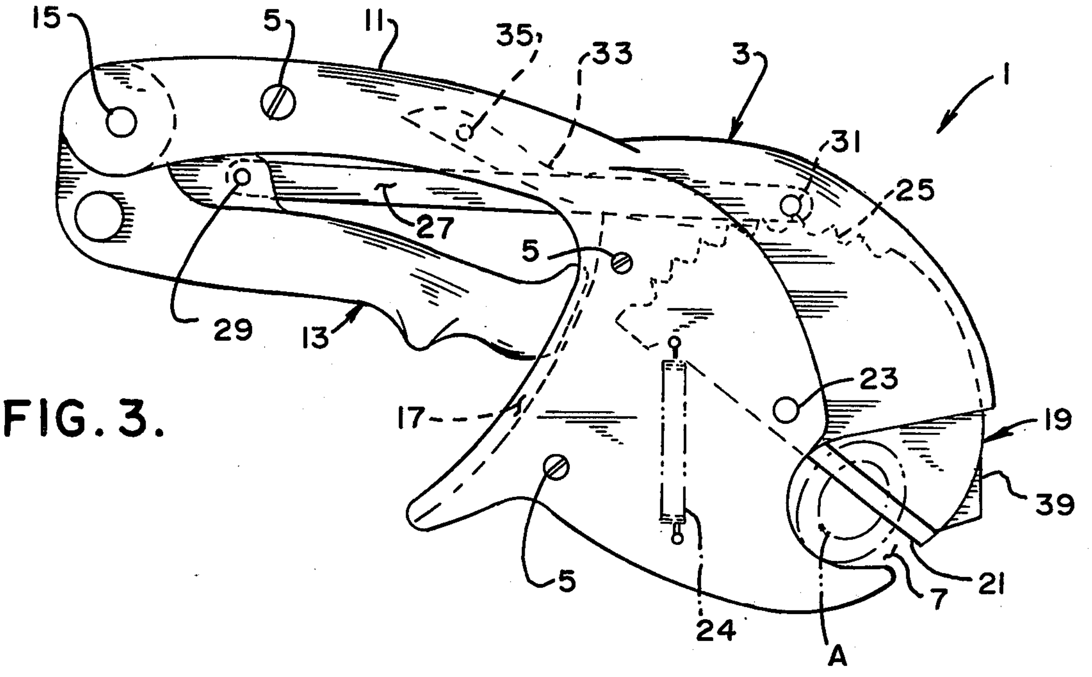
FIG. 3 is a view similar to FIG. 2 illustrating the blade in an intermediate cutting position and illustrating the movable handle of the cutter in its closed position.

Housing 3 has a rigid, stationary handle part 11 which extends rearwardly therefrom. As indicated at 13, a movable handle part is pivotally secured to the rear of the stationary handle by a hinge pin 15. Stationary handle 11 and movable handle 13 together constitute a handle assembly adapted to be readily gripped by one hand with the palm of the user's hand in engagement with the stationary handle and with his fingers gripping the movable handle. The latter is so structured as to be comfortably gripped by the user's fingers and for enabling the user to efficiently exert a maximum amount of force on the handle. The front end of the movable handle 13 rides in a slot 17 provided in housing 3 and it is swingably movable from an open position (as shown in FIGS. 1 and 2) in which the movable handle is spaced from the stationary handle a maximum distance and a closed position (as shown in FIG. 3) in which the handle parts are relatively close together. A suitable torsion spring 18 enclosed within the rear of handle portion 13 biases the movable handle toward its open position.

Tool 1 of this invention further comprises a generally semi-circular blade 19 having a cutting edge 21 on its outer diametric edge. The blade is pivotally mounted to housing 3 on its radial center, as indicated at 23, for rotational movement relative to the housing from a retracted position (see FIGS. 1 and 2) in which the blade together with its cutting edge 21 is clear of notch 7 and in which the blade is enclosed within the housing 3, to an extended cutting position (FIG. 3) in which the blade cuttingly engages the article A to be cut and which it cooperates with anvil 9 so as to cut the article, and finally to a cutoff or severing position in which it severs the article through. The blade is biased to return to its retracted position by a spring 24 so as to be made ready for the next cutting operation. As indicated at 25, the blade has a part-circular series of ratchet teeth extending over approximately one quadrant of the circular periphery of the blade, this part-circular series of ratchet teeth being generally concentric with pivot point 23 so that the teeth rotate in a generally circular path with respect to the housing about pivot point 23.

A link is pivotally secured, as indicated at 29, to movable handle 13 adjacent the rear end thereof. The link extend forwardly into housing 3 and carries a pin 31 on its front end, this pin being engageable with one of the ratchet teeth 25. A torsion spring 30 is fixed to the other end of the link 27 and engages handle 13, as handle 13 is moved toward its closed position, link 27 is caused to move toward stationary handle 11 and forwardly toward blade 19. The front end of link 27 and lug 31 move along a line of action generally tangent to the part circular series of ratchet teeth 25 at the point lug 31 engages its selected ratchet tooth. This forward movement of the link in generally tangential direction to blade 25 causes the latter to rotate about pivot pin 23. Due to the position in which link 27 is pinned to the movable handle and due to the tangential application of force to blade 19, the mechanical advantage of the incremental ratchet drive means of the tool of this invention is such that the blade is rotated through an increment of movement toward its cutoff position each time handle 13 is closed. Additionally, the mechanical advantage of the tool of this invention is such that when the user squeezes firmly on handle 13 as he closes the latter, a high level of cutting force is applied to blade 19 so as to cut the article. It will be appreciated that movable handle 13, link 27, and ratchet teeth 25 on blade 19 constitute drive means for forceably moving the blade through an increment of movement toward its cutting position upon opening and closing the handles.

Further in accordance with this invention, a pawl 33 is provided within housing 3 engageable with ratchet teeth 25 for preventing rotation of the blade toward its retracted position upon the return of movable handle 13 from its closed to its open position. Pawl 33 is pivotally mounted on housing 3, as indicated at 35, and is biased by a flat spring 36 so that its free or front end will engage a selected ratchet tooth 25. It will be noted that the pawl prevents a resilient, springy article being cut (e.g., a length of polybutylene tubing) from pushing the blade back toward its retracted position once the blade has initially engaged the article and has applied a cutting force to the article while the handle is being moved toward its open position.

As best shown in FIG. 1, housing 3 has a slot 37 in the front face thereof extending upwardly from notch 7. Blade 19 may optionally have a finger tab 39 which is received in slot 37 and which extends out beyond the front face of housing 3. The user may thus readily place his thumb or finger on tab 39 and manually move (i.e., rotate) the blade from its retracted position into cutting engagement with the article to be cut which is positioned in notch 7 in engagement with stationary anvil 9. This enables small diameter plastic pipe and tubing to even more rapidly be cut because the cutting blade may be quickly moved to engage the tubing without having to repeatedly cycle handle 13 so as to incrementally move the blade from its retracted position into cutting engagement with the tubing to be cut.

In operation, with blade 19 in its retracted position and with handle 13 open (as shown in FIG. 2), the article to be cut is placed in notch 7. The user picks up cutter 1 in one hand so that his palm bears on stationary handle portion 11 and so that his fingers grip movable handle 13. If the article to be cut is of a diameter appreciably smaller than the maximum diameter which cutter 1 can cut (i.e., if the article is appreciably smaller than notch 7), the user may rapidly rotate the blade into cutting engagement with the article by gripping tab 39 and rotating the blade from its retracted position until cutting edge 21 of the blade bears on the article.

With blade 19 in engagement with the article, the user then squeezes movable handle 13 toward stationary handle 11 so as to close the handle assembly. This in turn forces link 27 to move along its line of action generally tangent to the circular series of ratchet teeth 25 thereby causing blade 19 to momentarily rotate from its retracted position toward its cutoff position. It will be appreciated that pawl 33 is so positioned as to engage a ratchet tooth 25 as handle 13 completes an increment of movement toward its cutoff position so that as the handle begins to open (as shown in FIG. 3) and as lug 31 moves out of engagement with the ratchet teeth, blade 19 is prevented from being forced back toward its retracted position by the compression of the article being cut. Thus, upon the user again cycling (i.e., closing) the handle, pin 31 will engage another ratchet tooth and will further index the blade (i.e., move it through an increment) toward its cutoff position. When it is desired to open blade 19 and to return to its retracted position, the user merely continues to close the handle beyond the position shown in FIG. 3 so as to move lug 31 and pawl 33 clear of ratchet teeth 25 and to hold them there. Spring 24 is then free to return blade 19 to its retracted position.

Figure 4:
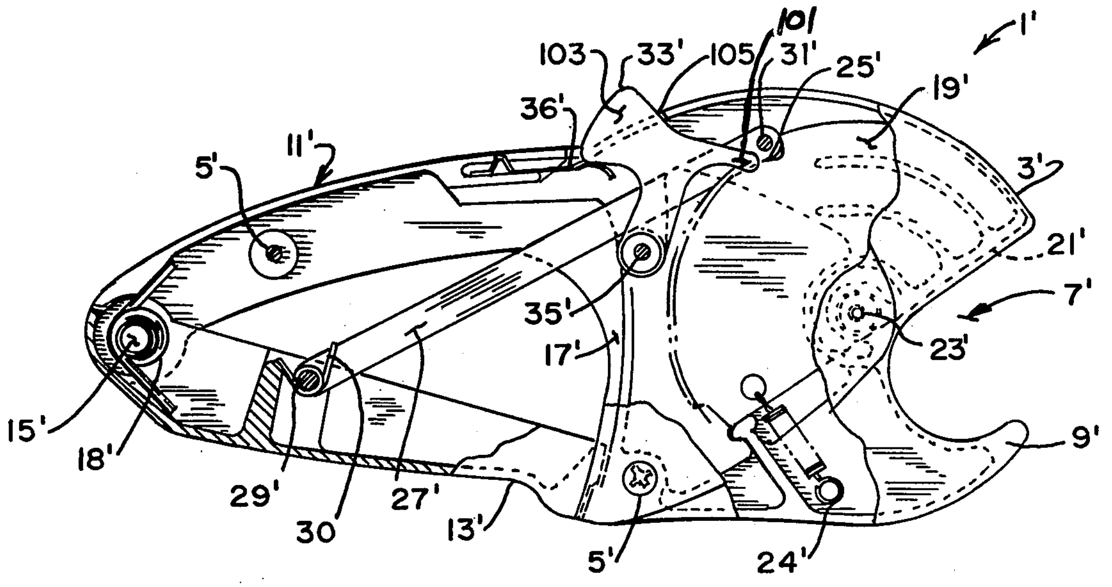
FIG. 4 is a side elevational view of a second embodiment of a plastic pipe cutter of the present invention with portions of the tool broken away for purposes of illustration.

Referring now to FIG. 4, the preferred embodiment, as indicated generally at 1', of the plastic pipe cutter of this invention is disclosed. Generally, cutter 1' is similar in construction and operation to cutter 1 heretofore described. Accordingly, a detailed description of cutter 1' is not deemed necessary. It will be understood that the "primed" reference characters in FIG. 4 depict parts having a similar construction and function as like numbered parts discussed herein in regard to cutter 1.

One particular difference between cutter 1 and cutter 1' is the construction and operation of pawls 33 and 33'. More specifically, pawl 33' is shown to have a finger 101 which engages a respective ratchet tooth 25' on blade 19' and a rear thumb-engageable portion 103 which extends out through an opening 105 in housing 3'. Upon the operator gripping pawl portion 103 with his thumb and forcing the pawl rearwardly away from teeth 25', and upon movable handle 13' being depressed so as to move member 31' clear of the ratchet teeth, spring 24' is permitted to return blade 19' to its retracted position.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A cutting tool particularly well-suited for cutting articles, such as plastic pipe or tubing, rubber hose, or the like, comprising a frame having a notch for receiving the article to be cut, a portion of said frame adjacent said notch constituting a stationary anvil, a blade having a cutting surface, said blade being rotatably mounted within said frame for rotation from a retracted position in which said blade including its cutting edge is enclosed within said frame and an extended cutoff position in which the cutting edge of the blade cooperates with said anvil so as to sever said article, handle means pivotally supported on said frame for swinging between an open and a closed position, means operable upon the repeated opening and closing of said handle means between an open position and an intermediate position for moving said blade in increments from its retracted position to its cutoff position, said blade moving means comprising a plurality of ratchet teeth on said blade, a link pivotally connected between said handle means and said blade and being engageable with one of said ratchet teeth on said blade when said handle means is open and acting on said one tooth as said handle means is moved from its open position toward its intermediate position thereby to effect incremental movement of said blade toward its cutoff position, said link being movable relative to said blade as said handle means is opened for engagement with another of said ratchet teeth, means for holding said blade against returning toward its said retracted position upon opening of the handle means thereby to permit the blade to be advanced another increment toward its cutoff position upon the next closing movement of the handle means said ratchet teeth being arranged in a part-circular pattern on said blade generally concentric with the point about which said blade is rotatably mounted with respect to said frame, said link being movable in a direction generally tangential to said part-circular pattern of ratchet teeth for moving said blade through its increment of movement upon closing said handle means, wherein said frame comprises a rigid frame portion rigidly connected to and extending rearwardly from said portion of said frame enclosing said blade, said handle means being pivotally secured to the rear of said rigid frame portion, said rigid frame portion being adapted to bear against the palm of one of the user's hands and the handle means being adapted to be readily gripped by the fingers of said one hand whereby upon squeezing of the rigid frame portion and the handle means together, said handle means swings toward said rigid frame portion for advancing said blade through an increment of movement toward its cutoff position.

2. A cutting tool as set forth in claim 1 in which said link is pivotally secured to said handle means adjacent the pivotal attachment of said handle means and said rigid frame portion.

3. A cutting tool as set forth in claim 2 wherein said blade holding means comprises a pawl pivotally carried by said frame movable between an engaging position in which said pawl engages said ratchet teeth thereby to prevent rotation of said blade toward its open positon and a retracted position in which said pawl is clear of said ratchet teeth thereby to permit said blade to rotate to its retracted position, and a spring for biasing said pawl toward its engaging position.

4. A cutting tool as set forth in claim 3 wherein said tool further includes a spring biasing said blade toward its retracted position, and wherein said pawl and said link are engageable by said handle means upon said handle means being moved from said intermediate position to its closed position for moving said pawl and said link clear of said ratchet teeth thereby to permit said spring to return the blade to its retracted position.

5. A cutting tool as set forth in claim 1 further having a spring for biasing said handle means toward its open position.

6. A hand-held and hand-operated cutting tool for cutting plastic pipe or the like and being capable of one handed operation, said tool comprising a housing having an opening therein for receiving the article to be cut, a blade rotatable mounted within said housing for swinging between a retracted position in which the blade is enclosed within said housing and is clear of said opening and a severing position in which the blade cooperates with a portion of the housing forming, at least in part, a portion of the opening so as to sever the article, a plurality of ratchet teeth on said blade, said housing including a stationary portion extending from the rear of the said blade enclosing portion of said housing and a handle pivotally secured to the rear of said stationary housing portion, said handle being swingable toward and away from said stationary housing portion between an open position and an intermediate position, a link pivotally connected to said handle and being engageable with one of said ratchet teeth so that upon movement of said handle from its open position toward said stationary housing portion said blade is rotated through an increment of movement toward its severing position, a pawl engageable with said ratchet teeth for preventing rotation of said blade toward its retracted position upon movement of said handle away from its said intermediate position to its open position for engagement of said link with another of said ratchet teeth, upon the next successive closing movement of said handle said handle and link effecting further movement of said blade through another increment of movement toward its severing position, said handle being further movable from its intermediate position toward said housing portion to a closed position in which it is cooperable with said link for moving the latter away from said ratchet teeth and for holding it clear thereof, when said handle is moved to its said closed position, said pawl being selectively movable clear of said ratchet teeth thereby to permit the return of said blade to its retracted position.

7. A cutting tool as set forth in claim 6 comprising a spring for biasing said cutting blade toward its closed position.

8. A cutting tool as set forth in claim 7 wherein said pawl has a portion thereof extending out beyond said housing for selective engagement by the operator of the tool for holding said pawl clear of said ratchet teeth whereby said spring is free to return said blade to its retracted position.

* * * * *